3,197,281
METHOD FOR REMOVING IRON FROM AQUEOUS CONCENTRATED ALKALI METAL HYDROXIDE SOLUTIONS

Melvin J. Hatch, Midland, Mich., assignor to The Dow Chemical Company, Midland, Mich., a corporation of Delaware
No Drawing. Filed Mar. 27, 1963, Ser. No. 268,442
4 Claims. (Cl. 23—184)

This invention concerns a method for removing iron compounds from aqueous concentrated alkali metal hydroxide solutions by chelation of the iron with a polymeric vinylbenzyl polyol ether chelate exchange resin.

Iron compounds are a common contaminant of commercial concentrated alkali metal hydroxide solutions, being introduced from the iron or steel vessels and processing equipment commonly employed in manufacture of said solutions.

With no prior art to point the way, it has been discovered surprisingly that polymeric vinybenzyl polyol ether resins are quite effective in chelating iron cations from aqueous concentrated alkali metal hydroxide solutions.

The resins utilized in this invention are prepared by reacting a salt form polymeric vinylbenzyl sulfonium anion exchange resin or a polymeric vinylbenzyl quaternary ammonium anion exchange resin, in each case cross-linked with about 0.25 to 6 mole percent of a conventional cross-linking agent having at least two $CH_2=C=$ groups, with at least an equivalent amount of the sodium salt of a polyol at an elevated temperature in the presence of sufficient molten polyol to maintain the reaction medium in a stirrable condition. The resins used in this method are claimed in copending United States patent application Serial No. 268,472, filed March 27, 1963.

The sulfonium anion exchange resins from which the polyol ether resins are made are described in United States patent application Serial No. 761,545, filed October 27, 1958, now U.S. Patent No. 3,027,826 or in United States Patent 2,895,925, while the quaternary ammonium anion exchange resins from which the polyol ether resins are made are described in United States Patents 2,591,573 and 2,614,099.

The following are operable polyols whose sodium salts are used to react with the sulfonium and quaternary ammonium resins as described above: sorbitol, mannitol, galactitol, talitol, arabitol, ribitol and mixtures thereof. Because of lower cost, the sorbitol ether resins are preferred.

By an elevated temperature is meant 70° to 130° C. when using the sulfonium resin route and 140° to 200° C. when using the quaternary ammonium resin route.

The reaction is continued until substantial completion, i.e., until sulfide is no longer evolved when the sulfonium resin route is used and until a tertiary amine is no longer evolved when a quaternary ammonium resin route is used. Since the polyols can react at more than one hydroxyl group, in some instances the polyol is attached through more than one ether linkage. Any multiple attachment of polyol groups is no serious disadvantage, since in the reaction sufficient vicinal hydroxyl groups always remain so that the resin maintains its high selectivity for iron cations. Thus, the resins used in the process of this invention have as substituents attached to aromatic nuclei groups selected from —$CH_2$—O—Z, (—$CH_2$—O—)$_2$Z and mixtures thereof, wherein Z is a polyol moiety, i.e., the moiety left when one or two of the hydroxylic hydrogens are removed, respectively.

By an aqueous concentrated alkali metal hydroxide solution is meant a 15 to 50 weight percent sodium hydroxide or equivalent alkali metal hydroxide solution (i.e., from 9 to 15 percent of lithium hydroxide up to a maximum of 75 percent francium hydroxide depending upon their solubilities).

In practice, an aqueous concentrated alkali metal hydroxide solution containing one or more iron compounds is contacted with a polymeric vinylbenzyl polyol ether, the polyol moiety necessarily having vicinal hydroxyl groups for chelating iron cations. Advantageously, the aqueous concentrated alkali metal hydroxide solution is fed to a bed of the polyol ether resin. The resin can be used until it is substantially loaded with iron cations, i.e., until iron cations appear in the effluent alkali metal hydroxide solution or have a concentration in the effluent approaching that in the feed or in excess of a predetermined specification level, as desired. By utilizing a polyol ether resin, pursuant to the method of this invention, it is possible to remove substantially completely iron compounds. Iron is eluted from the loaded polyol ether resin by elution with dilute mineral acids, such as hydrochloric acid or sulfuric acids of 0.1 to 5 normal strength.

The following examples describe completely representative specific embodiments of the inventive process and the best mode contemplated by the inventor of carrying out the invention. They are not to be considered limitative of the invention other than as claimed.

Example 1

A quantity of aqueous 50 percent sodium hydroxide solution containing iron compounds was passed through a bed of 50 ml. of a 50–100 mesh water swollen sorbitol ether resin contained in a ½ in. diameter resin column. The sorbitol ether resin was prepared as described above from one percent divinylbenzene-cross-linked polymeric vinylbenzyl trimethylammonium chloride resin. The sorbitol ether resin, prior to removing iron cations from caustic soda, was tested successfully for chemical and physical stability by heating it with 50 percent caustic solution at 80° C. for 16.6 days. The resin was thereafter washed with water until free of caustic. Following such treatment, it yielded 45 bed volumes of substantially iron-free caustic, i.e., one p.p.m. or less, as determined colorimetrically using a bipyridyl indicator, from an influent containing 12 p.p.m. iron at a flow rate of 2.5 gal./min./ft.$^2$. Temperature of the caustic influent was 80° C.

Example 2

The procedure of Example 1 was repeated with an influent 50 percent sodium hydroxide solution containing 19 p.p.m. iron. A yield of 14.5 volumes of substantially iron-free caustic was thereby obtained.

Example 3

The procedure of Example 1 was repeated raising the flow rate to 4.0 gal./min./ft.$^2$. A yield of 15 bed volumes of substantially iron-free caustic was thereby obtained.

Similarly advantageous results are obtained with polyol ether resins derived from the specified sulfonium anion exchange resins and also with the polyols other than sorbitol.

What is claimed is:

1. The method for removing iron from an aqueous concentrated alkali metal hydroxide solution containing an iron compound by contacting said solution with a water-insoluble cross-linked copolymer of a mixture of a monovinylaromatic hydrocarbon and a copolymerizable cross-linking agent which contains at least two $CH_2=C=$ groups, said cross-linking agent being present in molar amount of 0.25 to 6 percent, said copolymer having attached to nuclei thereof substituents of the group consisting of —$CH_2$—O—Z, (—$CH_2$—O—)$_2$Z and mixtures thereof, Z being a polyol group derived from sorbitol, mannitol, galactitol, talitol, arabitol, ribitol and mixtures thereof, and removing the surrounding alkali metal hydroxide solution from said copolymer.

2. The method of claim 1 wherein the monovinylaryl hydrocarbon is styrene and the cross-linking agent is divinylbenzene.

3. The method of claim 2 wherein the combined divinylbenzene is present in amount from about 0.25 to 2 molar percent.

4. The method of claim 1 wherein the aqueous alkali metal hydroxide solution is 50 percent sodium hydroxide.

References Cited by the Examiner

UNITED STATES PATENTS

| | | | |
|---|---|---|---|
| 2,853,414 | 9/58 | Wimmer | 260—209 |
| 2,885,393 | 5/59 | Herb | 260—209 |

MORRIS O. WOLK, *Primary Examiner.*